(12) United States Patent
Yoshizawa

(10) Patent No.: US 6,502,425 B1
(45) Date of Patent: Jan. 7, 2003

(54) BELT FOR BENDING A GLASS SHEET, AND METHOD AND APPARATUS FOR BENDING A GLASS SHEET USING THE SAME

(75) Inventor: Hideo Yoshizawa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/539,188

(22) Filed: Mar. 30, 2000

(30) Foreign Application Priority Data

Apr. 1, 1999 (JP) .......................................... 11-095408

(51) Int. Cl.[7] .............................................. C03B 23/033
(52) U.S. Cl. ........................... 65/106; 65/245; 65/273; 65/374.13; 198/844.1; 198/844.2; 198/846; 198/847; 198/957
(58) Field of Search ......................... 65/106, 245, 273, 65/374.13; 198/844.1, 844.2, 846, 847, 957

(56) References Cited

U.S. PATENT DOCUMENTS

| | | | |
|---|---|---|---|
| 3,545,951 A | 12/1970 | Nedelec | |
| 3,832,153 A | 8/1974 | Bezombes | |
| 4,069,617 A | 1/1978 | Koike | |
| 4,123,246 A | 10/1978 | Johnson | |
| 4,139,359 A | 2/1979 | Johnson et al. | |
| 4,292,065 A | 9/1981 | Nedelec et al. | |
| 4,318,728 A | * | 3/1982 | Claassen |
| 4,540,426 A | 9/1985 | Bocelli et al. | |
| 4,666,496 A | 5/1987 | Fecik et al. | |
| 4,820,327 A | 4/1989 | Letemps et al. | |
| 4,863,419 A | * | 9/1989 | Sansone |
| 4,899,872 A | * | 2/1990 | Hokao |
| 4,904,294 A | 2/1990 | Schultz et al. | |
| 4,957,528 A | 9/1990 | Letemps et al. | |
| 4,983,205 A | 1/1991 | Kuster et al. | |
| 5,022,907 A | 6/1991 | Vanaschen et al. | |
| 5,069,705 A | 12/1991 | Letemps et al. | |
| 5,264,058 A | 11/1993 | Hoagland et al. | |
| 5,286,542 A | * | 2/1994 | Susi et al. |
| 5,443,669 A | 8/1995 | Tünker | |
| 5,946,860 A | 9/1999 | Weber et al. | |
| 6,279,347 B1 | 8/2001 | Yoshizawa | |

FOREIGN PATENT DOCUMENTS

| | | | |
|---|---|---|---|
| DE | 3712162 | * | 1/1988 |
| DE | 39 08 644 C1 | | 3/1989 |
| DE | 39 28 968 C1 | | 9/1989 |
| DE | 41 04 086 C1 | | 2/1991 |
| EP | 0 133 114 | | 2/1985 |
| EP | 0 346 197 | | 12/1989 |
| EP | 0 477 913 A2 | | 4/1992 |
| FR | 2137143 | | 5/1971 |
| GB | 1103192 | | 3/1965 |
| GB | 1112781 | | 5/1965 |
| JP | 44-14832 | | 7/1969 |
| JP | 49-10331 | | 3/1974 |
| JP | 51-141123 | | 12/1976 |
| JP | 54-85217 | | 7/1979 |
| JP | 55-75930 | | 6/1980 |
| JP | 64-48315 | | 3/1989 |

(List continued on next page.)

Primary Examiner—Michael Colaianni
(74) Attorney, Agent, or Firm—Merchant & Gould P.C.

(57) ABSTRACT

This invention provides a belt for bending a glass sheet without surface defects caused by roller marks, belt junctions or belt deformations. A strip of heat-resistant member is joined together while the ends of the heat-resistant member are arranged so that they are not exposed at the surface defined by an endless track for bending the glass sheet. Alternatively, fitting portions are arranged along the endless track, and the glass sheets are bent while these fitting portions prevent a deformation of the belt. Bent glass sheets can be manufactured efficiently and without surface defects by bending the sheets while conveying them with such a belt.

13 Claims, 15 Drawing Sheets

FOREIGN PATENT DOCUMENTS

| | | |
|---|---|---|
| JP | 2-221133 | 9/1990 |
| JP | 3-50132 | 3/1991 |
| JP | 3-174334 | 7/1991 |
| JP | 05009037 A | 1/1993 |
| JP | 6-40732 | 2/1994 |
| JP | 7-237928 | 3/1995 |
| JP | 10-203840 A | 8/1998 |
| JP | 11-500796 | 1/1999 |
| JP | 11-147728 A | 6/1999 |
| WO | WO 99/24373 | 5/1999 |

* cited by examiner

A — A

B — B

C — C

BELT FOR BENDING A GLASS SHEET, AND METHOD AND APPARATUS FOR BENDING A GLASS SHEET USING THE SAME

FIELD OF THE INVENTION

The present invention relates to a belt for bending glass sheets and to a method for bending a glass sheet using the same.

BACKGROUND OF THE INVENTION

Bent glass sheets are widely used for vehicles and buildings, and especially in the field of window glass for vehicles, there is a great demand for bent glass sheets due to design and aerodynamic considerations. Flat glass sheets that have been mass-produced by the float process are formed into bent glass sheets in a secondary process, for which a number of industrial methods are known. Moreover, if the glass sheets are heated for the bending step, they often are quenched afterwards to temper them.

Press molds are used in most of the methods for bending glass sheets that have been suggested so far. However, during the forming step in these methods for bending glass sheets by press forming, the glass sheets have to be temporarily stopped in the press mold.

With regard to the manufacturing efficiency of continuous production of bent glass sheets, methods have been proposed wherein the glass sheets are bent without stopping them on the manufacturing line. In some of these methods, the glass sheets are heated and softened inside a furnace while conveying them horizontally, and each of the glass sheets is gradually adapted to the surface form of a glass conveying means, for example an airbed, using the glass sheet's own weight (sag bending). These methods are very efficient for continuous production of glass sheets having the same curved surface shape, and have been employed with various improvements (see for example Publication of Unexamined Japanese Patent Application No. Hei 7-237928).

Moreover, Publication of Unexamined Japanese Patent Application No. Sho 55-75930 discloses a method wherein a glass conveying passage having a curvature is set up in continuation to the carry-out opening of the furnace, and the glass sheets are bent while being conveyed by rollers along this conveyer passage. Compared to the method using the glass sheet's own weight, this method has a better heating efficiency and the shape of the glass sheets can be exchanged easier.

Other methods have been proposed, wherein, while conveying the glass sheets with rollers, the glass sheets are bent not only in the direction in which they are conveyed, but also in the direction that is perpendicular to the conveying direction (referred to as "cross direction" in the following). For example, Publication of Unexamined Japanese Patent Application No. Hei 3-174334 proposes a method, wherein rollers made of an elastic body are arranged above and below the glass sheets, and by applying a stress onto these roller pairs from the outside, the glass sheets are bent also in the cross direction. Roller pairs for bending glass sheets in a cross direction or for conveying glass sheets that have been bent in the cross direction are disclosed for example in Publication of Unexamined Japanese Patent Application No. Sho 54-85217 and No. Sho 55-75930.

However, in methods wherein the glass sheets are bent by rollers that are arranged above and below the conveyer passage, the surfaces of the glass sheets are pressed locally. Consequently, there is the problem that roller marks can appear easily on the surfaces of the glass sheets. Moreover, in eel intermittent bending with rollers, there is the problem that the freedom and precision with which the glass sheets can be formed are not sufficient. When bending with rollers, the glass sheets are bent while being suspended between the rollers. Therefore, it is difficult to attain the desired curved shape at the front end and the rear end in the conveying direction of the glass sheet. Moreover, when bending the glass sheets with rollers that are arched by elastic deformation, it is difficult to obtain precisely the desired curved shape.

Methods have been proposed, wherein the glass sheets are bent while contacting not rollers but a belt. For example, Publication of Unexamined Japanese Patent Application No. Hei 3-50132 discloses a method wherein a glass sheet is carried out of a furnace, conveyed by a belt to a pressing position, and press-formed together with the belt. This method takes advantage of the belt's flexibility to reduce the glass sheet's temperature decrease between heating and quenching. That is, the glass sheet is bent while it contacts the belt, and it is also quenched in this situation. Furthermore, Publication of Unexamined Japanese Patent Application No. Hei 2-221133 and No. Hei 6-40732 propose methods for bending and tempering glass sheets that are improvements of this method.

However, in the methods for bending the glass sheets by pressing them together with a belt, each of the glass sheets has to be temporarily stopped, so that there is still room for improvement regarding the manufacturing efficiency. Moreover, Publication of Unexamined Japanese Patent Application No. 3-50132 discusses the thermal conductivity of the belt in detail, but makes no mention of the defects in the surface of the glass sheet that occur due to the contact with the belt.

Thus, regarding these methods for bending a glass sheet while contacting it with a member using a glass conveyer means such as a rollers or a belt, there has still not been enough research concerning the defects on the surface of the glass sheet that occur due to the contact with the member, although these defects have a considerable influence on the final product quality of the bent glass sheet.

SUMMARY OF THE INVENTION

It is an object of the present invention, which has been conceived upon consideration of these circumstances, to provide a belt for bending a glass sheet that suppresses defects in the surface of the bent glass sheet. It is another object of the present invention to provide a method for bending a glass sheet with high manufacturing efficiency using this belt.

In order to achieve these objects, a first belt for bending a heated glass sheet having a heat-resistant surface for pressing a surface of the glass sheet comprises a strip of a heat-resistant member for forming the heat-resistant surface. The heat-resistant member is arranged so that the heat-resistant surface defines an endless track and end surfaces of the heat-resistant member are not exposed at the heat-resistant surface.

It is preferable that in this belt, (a) two end surfaces of the heat-resistant member, (b) two bent portions formed by folding the two end surfaces from an outer periphery of the endless track to an inner periphery of the endless track, or (c) one end surface of the heat-resistant member and one bent portion formed by folding the other end surface from an outer periphery of the endless track to an inner periphery of the endless track oppose each other on the endless track.

In this technical field, conventional belts are formed into loop-shape by simply overlapping the belt ends and joining the ends together. When the bending is performed using a belt instead of rollers, defects on the surfaces of the glass sheets can be reduced. However, there was the possibility that the step portion formed by the local overlap of the belt ends caused a defect in the surfaces of the glass sheets. In contrast, the inventive belt eliminates the local pressure difference applied to the surface of the glass sheet by eliminating this step portion.

A second belt for bending a heated glass sheet having a heat-resistant surface for pressing a surface of the glass sheet also comprises a strip of a heat-resistant member for forming the heat-resistant surface and the heat-resistant member is arranged so that the heat-resistant surface defines an endless track. This heat-resistant member has fitting portions arranged along a pair of side-edges of the endless track.

In this technical field, conventional belts are used while applying a tensional force only in the conveying direction of the glass sheet. However, these belts may be deformed or become wavy during the bending of the glass sheet, which causes defects in the surface of the glass sheet. In contrast, a tensional force is applied in the cross direction of the inventive belt, so that the surface of the belt is stabilized.

A method for bending a glass sheet in accordance with the present invention comprises bending a heated glass sheet by pressing the heat-resistant surface of the inventive belt against the glass sheet, while rotating the belt along the endless track and conveying the glass sheet along a portion of the endless track. With this method, bent glass sheets with suppressed surface defects can be manufactured with high efficiency.

It is preferable that the glass sheet is bent at least in a direction that is perpendicular to said endless track. If a belt having fitting portions is used, it is preferable that the belt is rotated using rollers that have members that fit into the fitting portions.

DETAILED DESCRIPTION OF THE PREFERRED EMBODIMENTS

The following is a more detailed explanation of the preferred embodiments of the present invention with reference to the accompanying drawings.

First Embodiment

Figure 1:
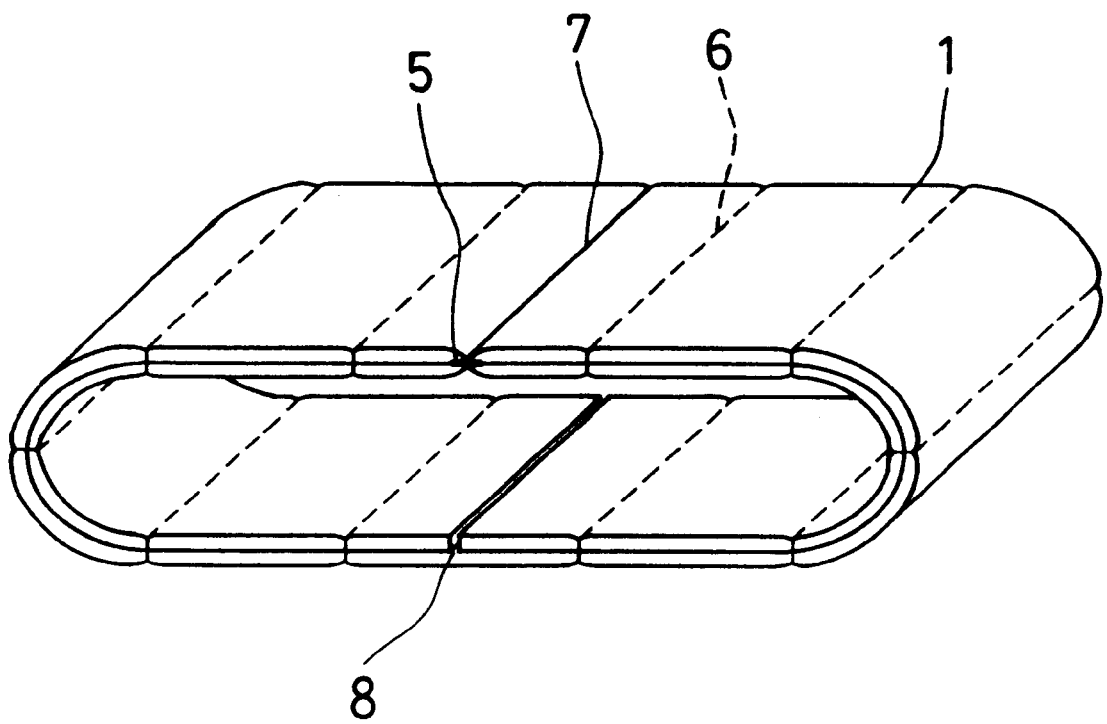
FIG. 1 is a perspective view of a first embodiment of the belt for bending glass sheets according to the present invention.
Figure 2:
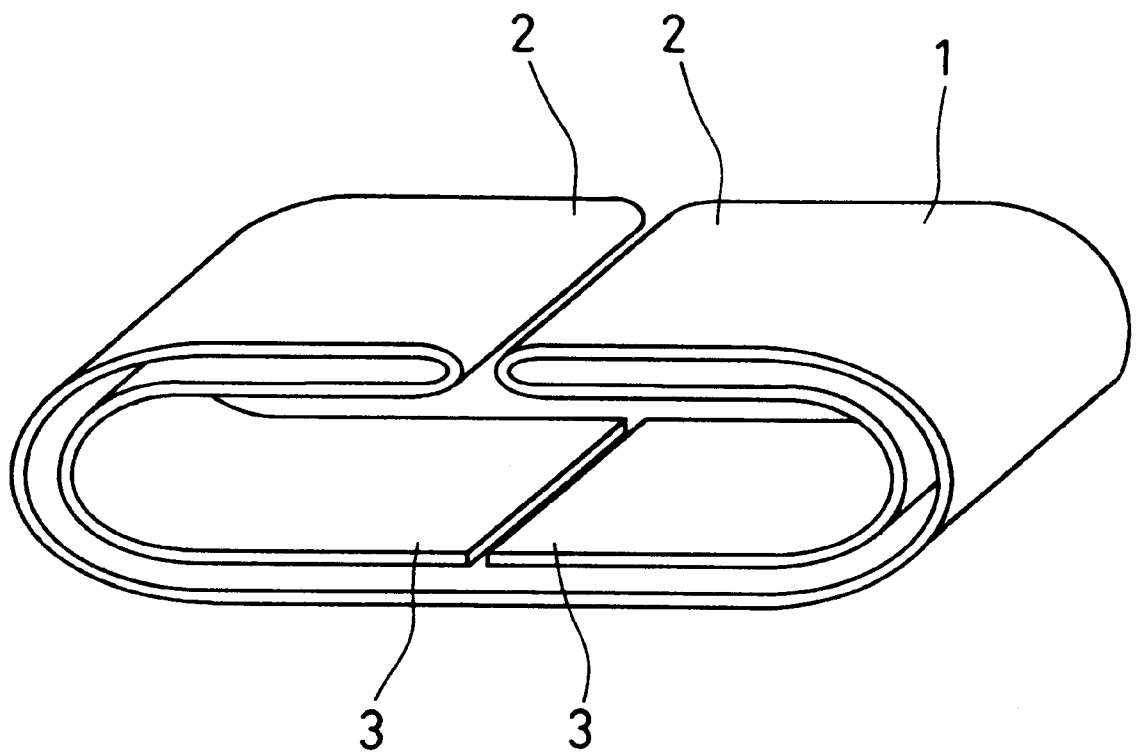
FIG. 2 is a perspective view illustrating the configuration of the belt of FIG. 1.

FIG. 1 is a perspective view of a first embodiment of the belt for bending glass sheets according to the present invention. FIG. 2 is a perspective view illustrating the configuration of the belt of FIG. 1. This belt is formed by taking a strip of heat-resistant member 1, opposing the two bent portions 2, that are formed by folding the two longitudinal ends of the heat-resistant member 1 inside, and joining the two bent portions 2 together, so as to form one loop.

The heat-resistant member 1 is sewed together with a heat-resistant material 5 at a connecting portion 7 where the two bent portions 2 contact each other. Moreover, the inner portion and the outer portion of the heat-resistant member 1 are similarly sewed together in the belt's cross direction with heat-resistant materials 6, the number and intervals of which depend on the circumference of the belt. The belt is sewed together like this and steps due to overlapping belt portions on the circumferential surface of the belt, which comes in contact with the heated glass sheet, can be eliminated.

Figure 15:
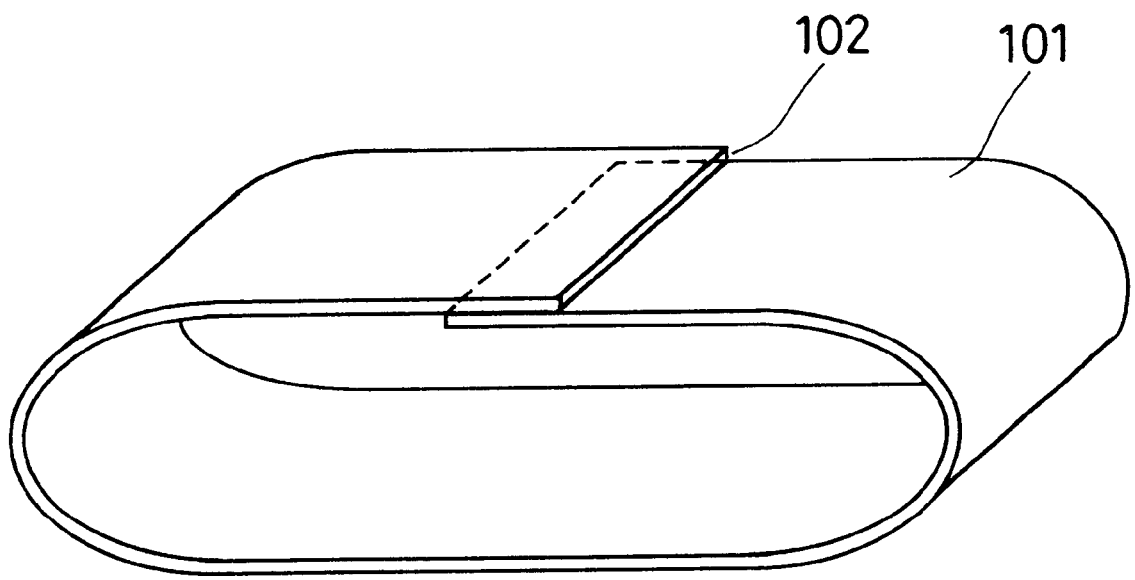
FIG. 15 is a perspective view showing a conventional belt used for bending glass sheets.

For comparison, FIG. 15 shows a conventional belt configuration that is in widespread use for conveying glass sheets. This belt is formed by simply overlapping both ends of a heat resistant member 101 and joining them together. Therefore, one end portion 102 of the heat resistant member 101 is exposed on the outer surface of the belt, and causes a step in the belt surface.

When the belt in FIG. 15 is used only as a conveying belt, the step in the surface does not pose a large problem in terms of causing defects in the glass sheets. However, if this belt is a forming belt used for bending a glass sheet into a predetermined form by being pressed onto the heated glass sheet surface, the step in the belt surface causes defects in the surface of the glass sheet.

In the surface of the belt of FIG. 1, there is a slight indentation, because the heat resistant member is tucked into the connecting portions 7. However, in a secondary step, the glass sheet is usually heated to a temperature where it is deformed when being pressed, but it is not heated to a temperature where it softens enough to intrude into these tiny indentations. Therefore, in practice, this slight indentation in the connecting portion 7 does not cause any defects in the surface of the glass sheet.

In the present embodiment, the two bent portions of the belt are fastened together. However, the present invention is not limited to this configuration, and it is also possible that the bent portions are not fastened together but oppose each other.

There will be no defects in the surface of the glass sheet caused by the discontinuity in the junction portion, if the space between the bent portions in the junction portion is not more than about 3 mm. This has been verified using the continuous bending device for bending glass sheets discussed below. On the other hand, it has also been further verified that defects occur on the glass surface, even if there are only small protrusions (overlaps) on the belt surface.

In the belt according to the present embodiment, the ends 3 of the inwardly folded heat-resistant member go around substantially half-way along the circumference of the member, and oppose each other substantially at the opposite of the connecting portion 7. This opposing portion 8 does not have to be at the same position as the connecting portion 7. Also in the opposing portion 8, the ends of the heat-resistant member do not overlap each other. Thus, the belt of the present embodiment has substantially the same thickness all along its circumference. Consequently, a glass sheet can be bent with a more uniform pressure. If the belt is for example a double layered heat-resistant fabric with about 0.5 mm thickness, it is preferable that the space between the end surfaces in the opposing portion 8 is not more than 5 mm.

Figure 3A:
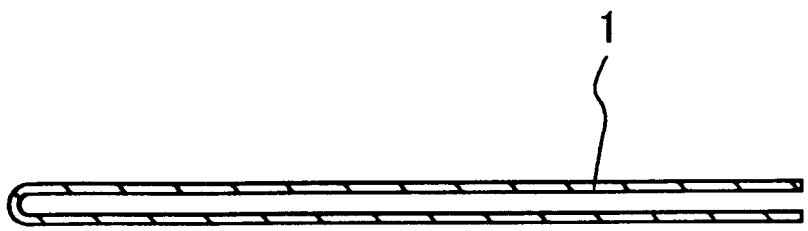
FIGS. 3A to 3D illustrate cross sectional views in steps of a method for manufacturing the belt shown in FIG. 1.
Figure 3B:
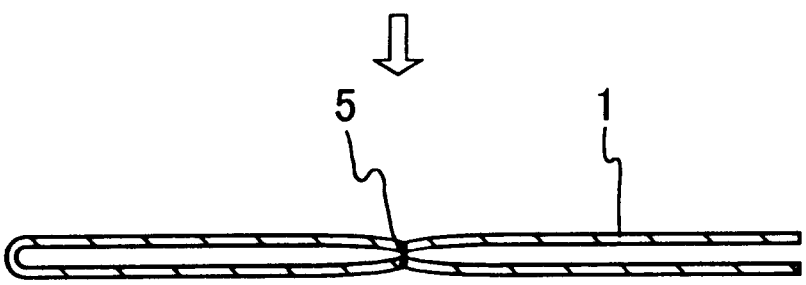
Figure 3C:
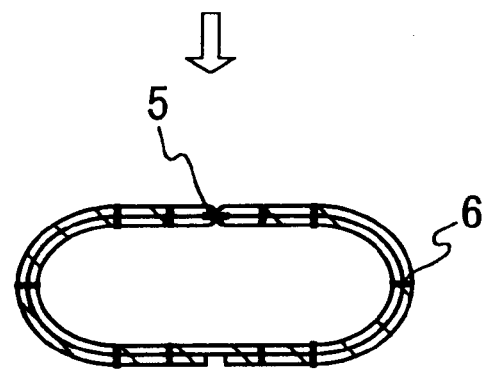
Figure 3D:
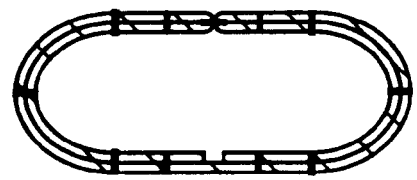

FIGS. 3A to 3D illustrates an example of a method for manufacturing such a belt. First, a strip of heat-resistant member 1 with a predetermined length is provided. The heat-resistant member 1 is folded at its center in the longitudinal direction (FIG. 3A). Then, the folded heat-resistant member 1 is sewn together with a heat-resistant thread 5 near the center in the longitudinal direction of the heat-resistant member 1, and a loop having about half the perimeter of the entire length of the heat-resistant member 1 is formed (FIG. 3B). Then, the belt-shaped portions of the heat-resistant member 1 are fitted along the outer circumference of this loop, and the inner portion and the outer portion of the heat-resistant member 1 are sewn together with a heat-resistant thread 6 at as many places as is necessary to maintain a necessary strength (FIG. 3C). Finally, the outer surface and the inner surface of the loop are turned inside out, so that the inner portion and the outer portion of the heat-resistant member 1 change places (FIG. 3D).

With the method shown in FIG. 3, a belt for bending glass sheets in accordance with the present embodiment can be easily manufactured using only machinery that is in general use, such as a sewing machine, and without any special machinery or technology.

Outside this technical field (for example for copying machines), techniques are known for making loops where the ends themselves have been eliminated, for example by special processes such as weaving a sleeve. However, for bending glass sheets, it is not necessary to employ costly special weaving processes, and the objects of the present invention can be easily achieved by arranging the end surfaces of a belt-shaped heat-resistant member in a manner that they are not exposed on the surface as described above.

Second Embodiment

Figure 4:
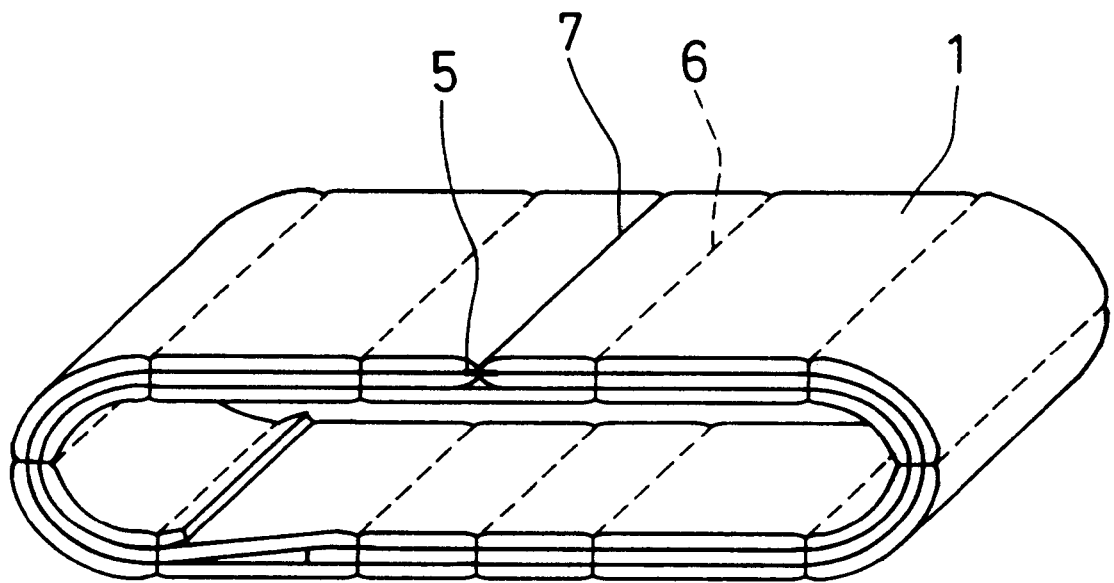
FIG. 4 is a perspective view of another example of a belt for bending glass sheets in accordance with the present invention.

FIG. 4 is a perspective view of an example of another belt for bending glass sheets in accordance with the present invention. This belt differs from the belt in the first embodiment in that its thickness is that of three layers of the heat-resistant member 1 for substantially its entire circumference, whereas the thickness of the belt of the first embodiment is that of two layers of the heat-resistant member 1. However, what is the same as in the belt of the first embodiment is that while the belt-shaped heat-resistant member 1 forms a heat-resistant surface that defines an endless track for bending glass sheets, two bent portions are formed by folding the heat-resistant member inwards, and these bent portions are sewn together.

As the belt of the first embodiment, this belt can be used as a belt for forming glass sheets wherein defects on the surface of the glass sheets are suppressed. Moreover, it can be easily manufactured by sewing with heat-resistant materials 5 and 6, as shown in FIG. 3.

In the belt of FIG. 4, the heat-resistant member 1 is arranged in a manner that the ends of the heat-resistant member do not overlap on the inside, and the belt has a substantially uniform thickness over the entire circumference.

To be specific, in the present embodiment, the heat-resistant member can be made of a heat-resistant woven fabric, a heat-resistant non-woven fabric, a heat-resistant felt or a heat-resistant mesh material. However, the heat-resistant member does not have to be limited to these materials, as long as it has enough heat-resistance to be used at temperatures used for the bending of glass sheets (about 550 to 700° C. glass sheet temperature) and enough smoothness so that it does not inflict defects to the surface of the glass sheet.

As a heat-resistant material for sewing the heat-resistant member, heat-resistant metal fibers, inorganic fibers, glass fibers, carbon fibers, or organic heat-resistant fibers (for example, aramid fibers) can be used alone or in combination. These materials, if plainly woven, twilled, knitted or felted, can also be used for the heat-resistant material.

Moreover, in the above two embodiments, the junction was performed by sewing. However, the present invention is not limited to sewing, and the junction can also be formed by gluing, fusing or welding.

Third Embodiment

Figure 5:
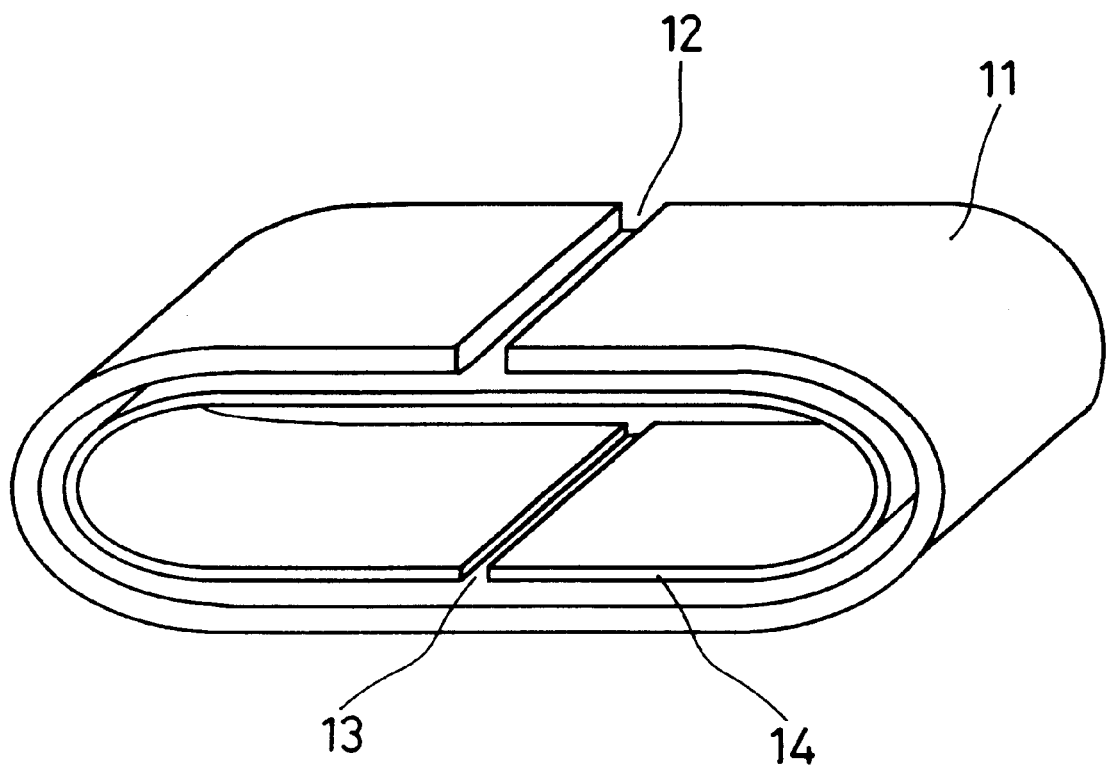
FIG. 5 is a perspective view of yet another example of a belt for bending glass sheets in accordance with the present invention.

FIG. 5 is a perspective view of an example of yet another belt for bending glass sheets in accordance with the present invention. This belt comprises two strip-members that are arranged so that their longitudinal end surfaces oppose each other, and these members together form one loop. As is shown in FIG. 5, the position where the end surfaces of the outside heat-resistant member 11 oppose each other is at a different position than the portion where the end surfaces of the inside supporting member 14 oppose each other.

As can be seen from FIG. 5, the forming belt is made by joining the two members 11 and 14 together. As in the preceding two examples, steps due to overlapping of the belt can be eliminated, because the end surfaces of the heat-resistant member 11 are not exposed on the outer surface of the belt.

Also in this embodiment, the above-mentioned materials can be used for the heat-resistant members. The same materials can be used for the supporting member as well, but other materials can also be used, as long as they can maintain heat-resistance in the above mentioned temperature range used for bending glass. While there is no particular restriction, it is appropriate to used a heat-resistant felt for the heat-resistant member and a felt or a woven fabric for the supporting member.

Because the supporting member 14 is arranged substantially all along the inner circumference, this belt as well has substantially the same thickness along its entire circumference. Also for this belt, it is preferable that the space in the opposing portion 12 of the heat-resistant member is not more than about 3 mm, and the space in the opposing portion 13 of the supporting member is not more than about 5 mm, if for example a dual structure with a heat-resistant felt of about 2 mm thickness is used.

Moreover, as in the above embodiments, there is no particular limitation to sewing the junction between the heat-resistant member and the supporting member, as long as the objects of the present invention are attained.

In the belt as described in the above first to third embodiments, defects in the surface of the formed glass sheet are suppressed, because the longitudinal ends of the belt-shaped heat-resistant member are not exposed on the surface of the belt, and the outer surface is formed flush in the circumferential direction forming an endless track. In the fourth embodiment, a belt is explained wherein deformations during the contact with the glass sheet are prevented, so as to suppress defects in the surface of the glass sheet even better.

Fourth Embodiment

Figure 6:
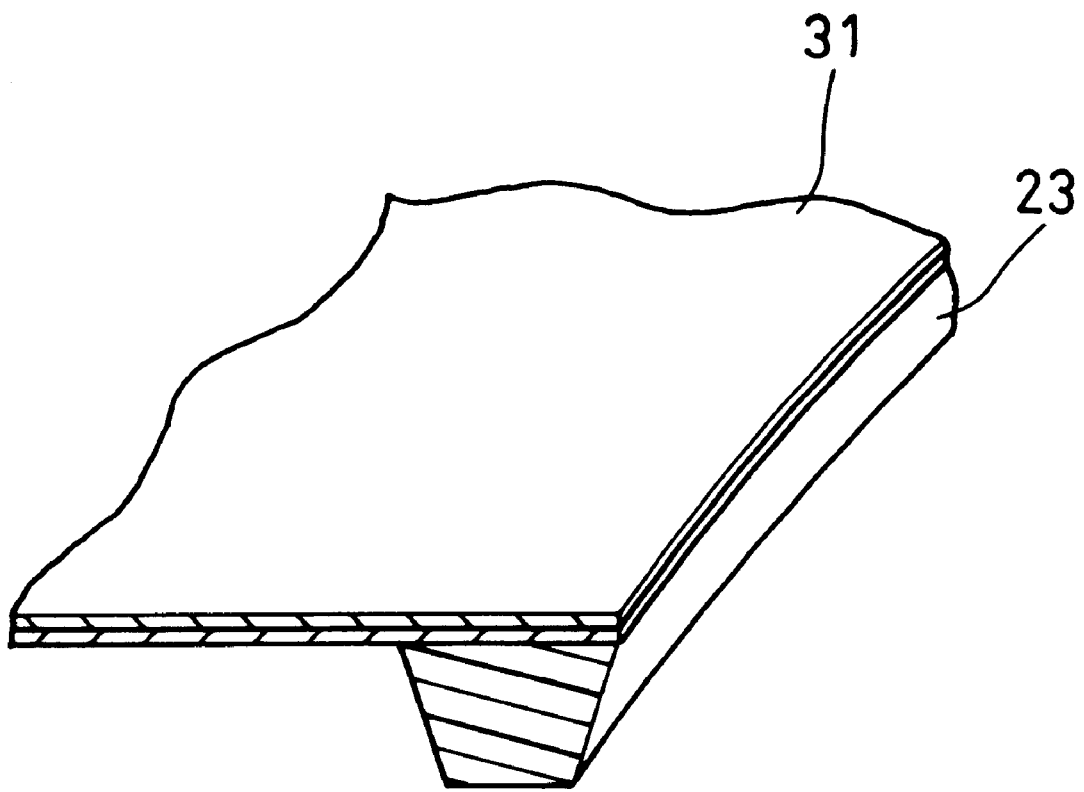
FIG. 6 is a partial perspective view also of another belt for bending glass sheets in accordance with the present invention.

FIG. 6 is a partial perspective view also showing a partial perspective view of a belt in accordance with this embodiment. As is shown in FIG. 6, a fitting portion 23 having a trapezoid cross-section (V-ribbed guide) is attached to a side of the heat-resistant member 31.

Figure 7:
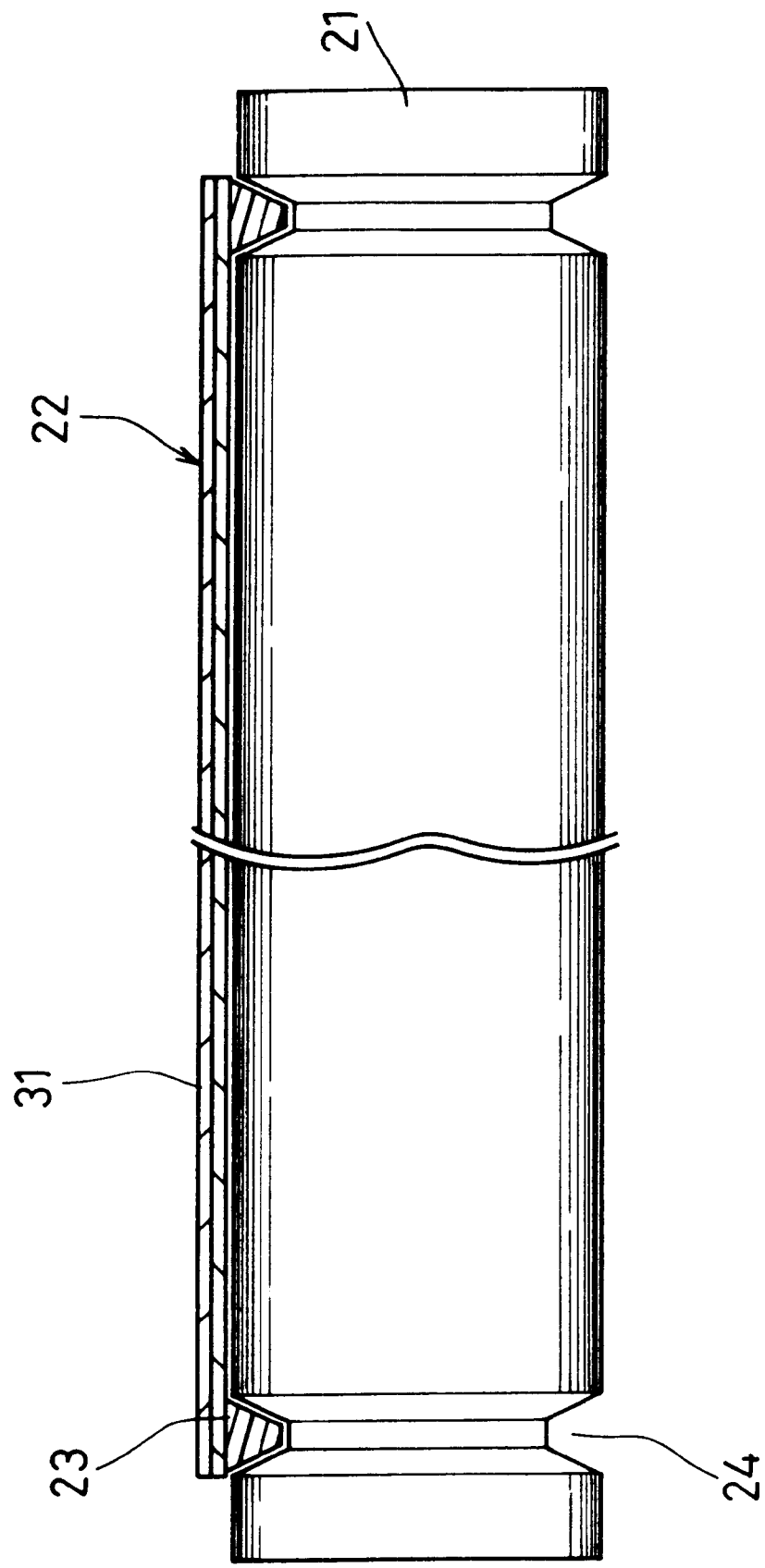
FIG. 7 is a partial perspective view showing the belt in FIG. 6 in use.

As is shown in FIG. 7, the belt 22 has a pair of V-ribbed guides along side-edges of its surface. A roller 21 having a pair of trapezoid cross-section grooves 24 on its outer surface (V-grooved pulley) is used for driving the belt. By fitting the V-ribbed guides 23 with the V-grooves 24, it is possible to drive the belt while controlling its width.

Compared to a belt that is used simply for conveyance, the reactive forces from the surface of the glass sheet to the belt are large, when the belt is used as a forming belt, so that variations in the direction of the belt width occur easily. Thus, the glass sheet is not pressed uniformly, and in extreme cases, the belt becomes wavy and causes defects in the surface of the glass sheet.

Moreover, if used as a forming belt, the belt is pressed onto a glass that is heated to a comparatively high temperature, so that non-uniform contact between the belt and the glass sheet tends to make the temperature distribution on the belt surface more pronounced. A large temperature distribution can lead to partial extensions and contractions or hardening of the belt, and typically can lead to defects in the belt surface that occur as "wrinkles", parallel to the (circumferential) travelling direction, when the tension in the cross direction is weak. The defects in the belt surface are transferred to the glass sheet, thereby lowering the quality of the bent glass sheet. Such a lowering of the product quality can be observed for example by a rise of the haze ratio in the glass sheet.

However, using a belt having fitting portions such as the V-ribbed guides 23, the belt can be rotated while applying a tension in both the circumferential direction and the cross direction. Consequently, the belt can be pressed onto the surface of the glass sheet in a stable manner and without wrinkles, and defects on the belt surface due to the temperature distribution can be avoided.

Figure 8:
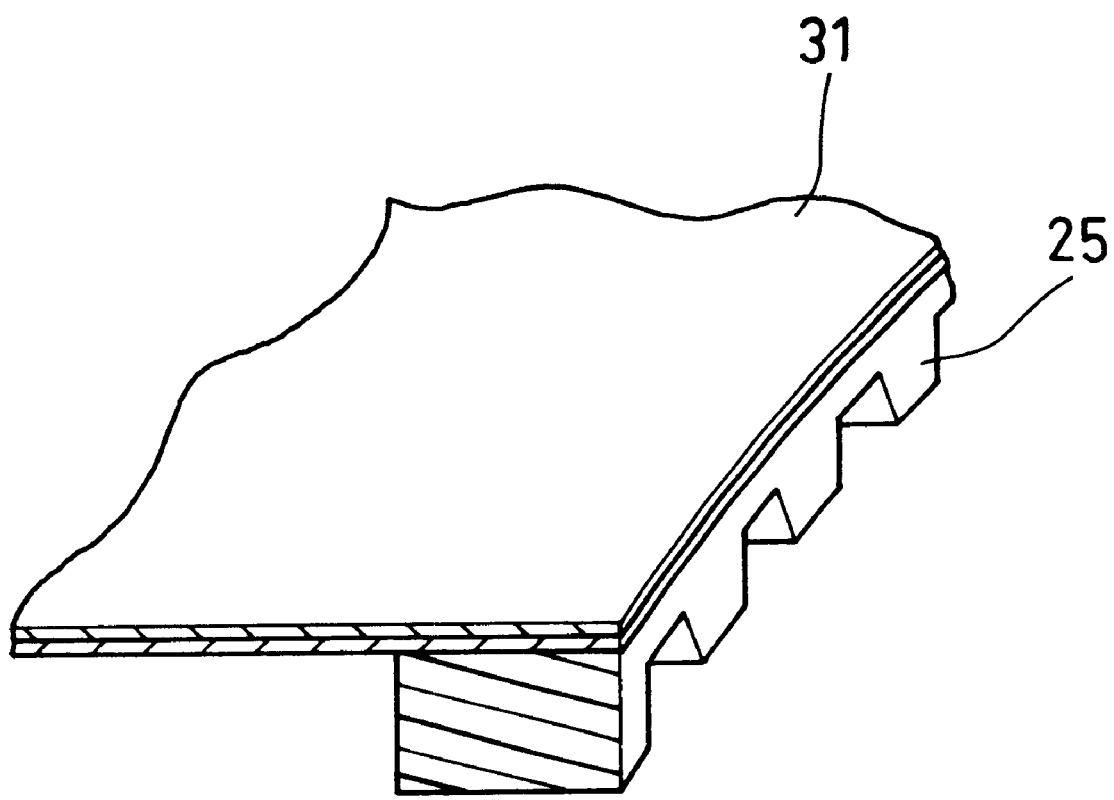
FIG. 8 is a partial perspective view also of yet another belt for bending glass sheets in accordance with the present invention.

Possible fitting portions for the belt are not limited to V-ribbed guides, and there is no particular limitation to their shape, as long as they can restrict the movement and the deformation of the belt. In particular, it is also possible to attach a timing guide 25, as shown in FIG. 8, for example. When a pulley fitting with the guides 25 is used as a roller, the friction between the belt and the rollers can be increased, so that, as above, surface defects on the belt can be avoided effectively.

In the present embodiment, as in the preceding embodiments, the heat-resistant member can be made of a heat-resistant woven fabric, a heat-resistant non-woven fabric, a heat-resistant felt or a heat-resistant mesh material. However, the heat-resistant member does not have to be limited to these materials, as long as it is heat-resistant at temperatures used for the bending of glass sheets (about 500 to 700° C.) and has enough smoothness so that it does not impart defects to the surface of the glass sheet.

Furthermore, there is no particular limitation concerning the method with which the guides are attached to the heat-resistant member, and this can be done for example by sewing, gluing, fusing or welding.

Moreover, also in this embodiment, it is preferable that the ends of the heat-resistant member are arranged as in the above first to third embodiments, and it is preferable to provide the fitting portions of the present embodiment to the first to third embodiments as well.

Fifth Embodiment

The following is an explanation of a method for manufacturing a bent glass sheet using a belt for bending glass sheets as described above. In this method, a heated glass sheet is bent while being conveyed, and a belt according to any of the above four embodiments can be applied to this method.

Figure 9:
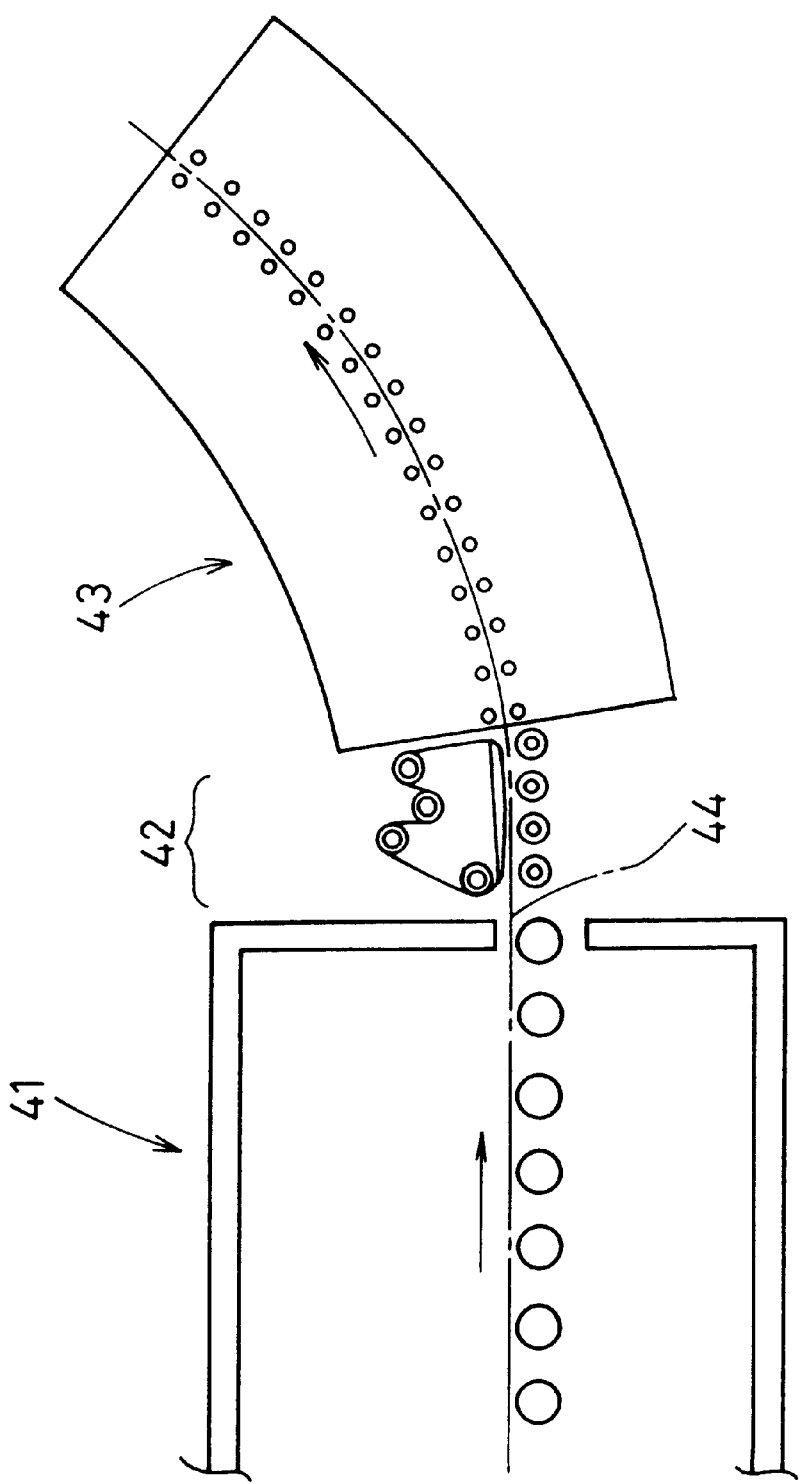
FIG. 9 is a cross-sectional view showing an embodiment of an apparatus for implementing the manufacturing method of the present invention.

FIG. 9 is a cross-sectional view showing an embodiment of an apparatus for implementing this method. As is shown in FIG. 9, this manufacturing apparatus is installed along a glass conveying passage 44, and comprises a furnace 41, a bending device 42, and a quenching device 43. Inside the furnace 41, the glass conveying passage 44 is substantially horizontal; in the bending device 42, it tilts gradually upwards; and in the quenching device 43, it describes a curve having a certain curvature radius $R_1$.

Figure 10:
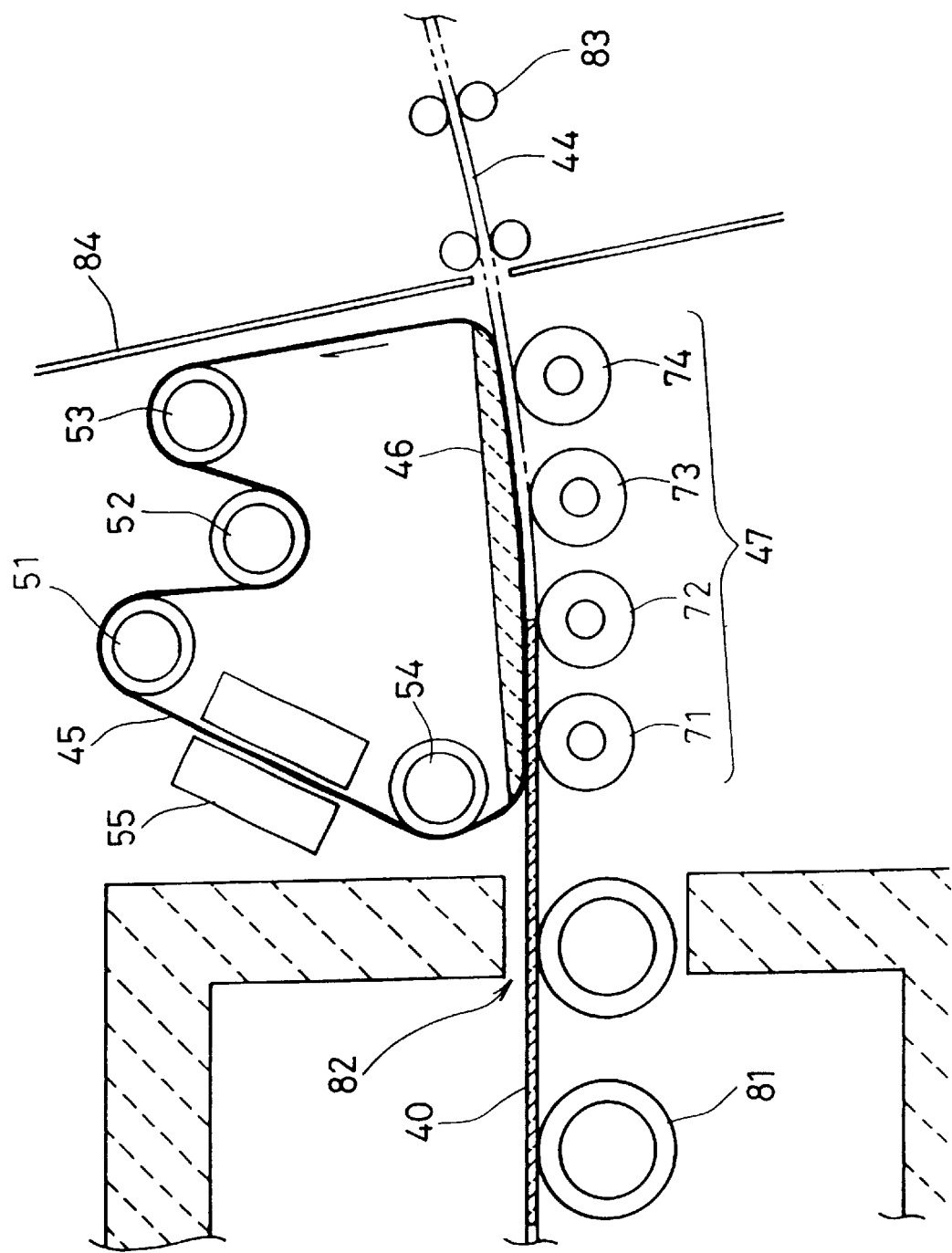
FIG. 10 is a cross-sectional view showing a magnification of the bending device of the manufacturing apparatus shown in FIG. 9.

FIG. 10 is a cross-sectional view showing a magnification of the bending device 42 of the apparatus shown in FIG. 9. As is shown in FIG. 10, in this bending device, press rollers 47 are arranged below the glass conveying passage 44, and a form block 46 is arranged above the glass conveying passage 44.

The bending device comprises a belt 45 for bending glass sheets (also referred to as "heat-resistant belt" in the following). A portion of the heat-resistant belt 45 is arranged along the glass conveying passage 44, between the glass conveying passage 44 and the form block 46.

The heat-resistant belt 45 is suspended as a loop by the rollers 51, 52 etc. and the form block 46, and describes an endless track. The rollers include a driving roller 51 and a tension roller 52. The driving roller 51 is connected to a driving mechanism (not shown in the drawing). By adjusting the position of the tension roller 52, the tension of the heat-resistant belt 45 can be maintained at an appropriate level. Moreover, belt temperature adjustment devices 55 are arranged on both sides of the endless track of the heat-resistant belt 45. The temperature of the heat-resistant belt 45 can be adjusted to an appropriate range for bending glass sheets by heating and cooling with the belt temperature adjustment devices 55.

If the heat-resistant belt 45 comprises fitting portions to prevent shifting or deforming of the belt, as explained in the fourth embodiment, rollers are used that have members that fit into these fitting portions. In this case, it is not necessary that all rollers have these fitting members, but it is preferable that a plurality of rollers including the two rollers 53 and 54 that are the closest to the glass conveying passage 44 and/or the driving roller 51 have fitting members.

As is shown in FIG. 10, a portion of the surface of the form block 46 contacts the endless track defined by the heat-resistant belt 45, and this portion faces the glass conveying passage 44. The surface of the form block 46 that faces the glass conveying passage 44 is pressed onto the glass sheet and functions as the forming face for bending the glass sheet. As a material for forming the block 46, various kinds of metals or ceramics can be used. The form block 46 can be made of one piece as shown in FIG. 10, but it also can be assembled of several separate members.

Figure 11:
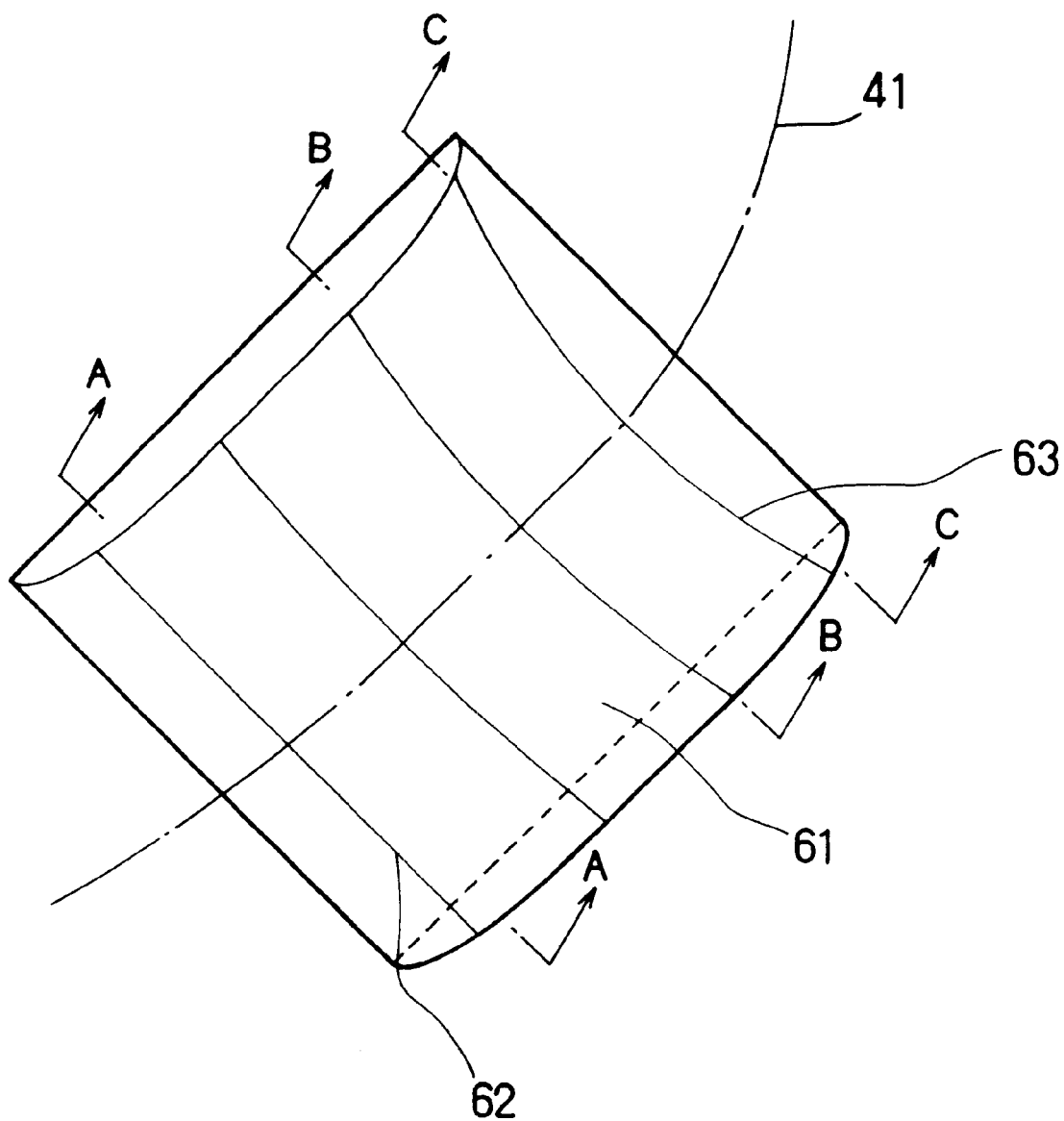
FIG. 11 is a perspective view showing an embodiment of the form block.
Figure 12A:
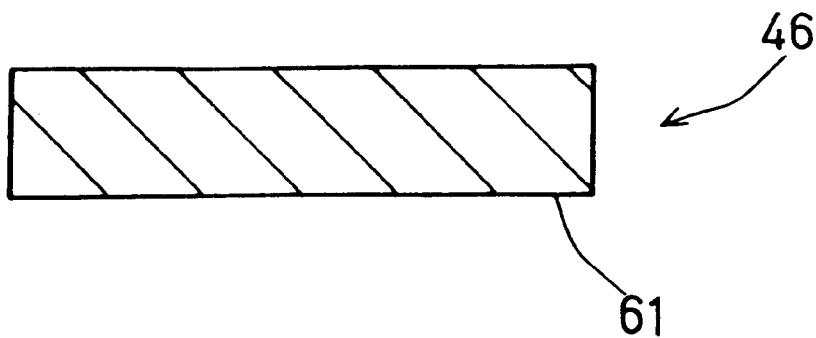
FIGS. 12A to 12C are cross-sectional views of the form block in FIG. 11 taken along lines A—A, B—B and C—C respectively.
Figure 12B:
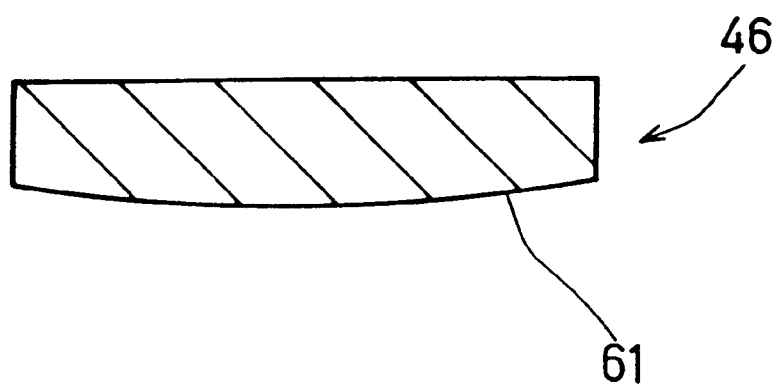
Figure 12C:
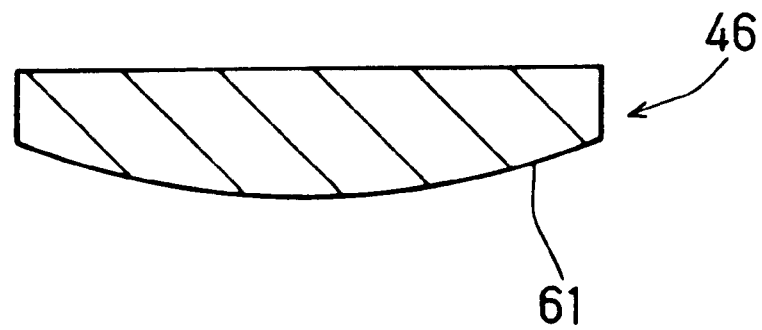

FIG. 11 is a perspective view showing the forming face 61 of an embodiment of the form block from below. FIGS. 12A to 12C are cross-sectional drawings of the form block 46 in FIG. 11, taken along the lines A—A, B—B, and C—C, respectively. Near the line of first contact 62, where the glass sheet contacts the form block 46 first, the forming face 61 is flat (FIG. 12A). Proceeding in conveying direction of the glass conveying passage 44, the forming face 61 bends gradually (FIG. 12B). Near the line of last contact 63, where the glass sheet separates from the form block 46, the forming face 61 applies to the glass sheet a predetermined curved shape in the cross direction of the glass sheet (FIG. 12C). The curved shape of the forming face 61 shown in FIG. 12C will be the shape that is applied to the glass sheet in the cross direction. This curved shape can have for example a predetermined curvature radius $R_2$, or it can be for example an arch with an eccentric vertex.

As is shown in FIGS. 11 and 12, near the line of first contact, the forming face 61 is parallel to the direction in which the glass sheet is conveyed from the furnace (horizontal direction). Proceeding in the conveying direction, the forming face can gradually tilt upwards so that the forming face 61 has substantially the same curvature radius $R_1$ as the glass conveying passage inside the quenching device near the line of last contact, It is preferable that a heater is attached to the form block 46. Thus, the form block can be kept, like the belt, at a temperature that is appropriate for bending glass, and the glass sheet can be formed accurately from the initial stage in a continuous production.

As is shown in FIG. 10, the press rollers 47 are arranged along the lower side of the conveyer passage 44. The purpose of these press rollers 47 is to press the glass sheet against the form block 46, while it is travelling along the conveyer passage 44. Like the heat-resistant belt, the surface of the press rollers 47 is made of a heat-resistant material. It is preferable that a material such as felt is used that cushions the glass sheet. Furthermore, the press rollers 71, 72 etc. are non-driven rollers (free rollers) that rotate with little external force. It is of course also possible to connect the press rollers 47 to a driving mechanism to rotate them with the rotational velocity that is necessary to convey the glass sheet.

The number of press rollers 47 can be determined in accordance with the desired curved shape for the glass sheet, but in general, at least two rollers are necessary. It is preferable to provide at least five rollers.

For the rollers 71, 72 etc., a rod can be used that is made, for example, of an elastic body to which a supporting member for supporting the glass sheet has been attached. For this supporting member, a plurality of disk-shaped or cylindrical flexible sleeves can be used, for example. Furthermore, the rollers do not have to be formed of one body, and it is also possible to use a plurality of rollers across the cross direction of the glass sheet.

For the furnace 41, a conventional device can be used. There is no particular limitation concerning the glass conveying means inside the furnace 41, but considering heating efficiency, rollers 81 are preferable.

Inside the quenching device 43, the glass conveying passage has a curvature radius $R_1$, which is the curvature radius that has been applied to the glass sheet in the conveying direction. Conveying rollers 83 are arranged above and below the glass conveying passage (see FIG. 10). For the conveying rollers 83, roller pairs are used that have the same curved shape in the cross direction as the curved shape that has been applied to the glass sheet. The glass sheet is conveyed while being sandwiched by these roller pairs. Moreover, nozzles for blowing cool air (not shown in the drawings) are arranged along the glass conveying passage 44. This is to obtain quenched tempered glass. But it is also possible to slowly cool (anneal) the curved glass, while conveying it along the conveyer passage, without blowing cool air onto it. Moreover, further downstream the quenching device 43, a converter can be arranged that modifies the conveying direction of the glass sheet into a predetermined (for example, horizontal) direction.

The following is an example of the method for manufacturing a curved glass sheet using the above-described apparatus. A glass sheet 40 made of soda-lime silicate glass is heated in a furnace 41 to a temperature near its softening point (for example to a temperature between the strain point and the softening point), while conveying rollers 81 inside the furnace 41 convey it in a horizontal direction, and is released in a formable state in a horizontal direction through a carry-out opening 82 of the furnace 41. When the glass sheet 40 is inserted into the bending device 42, it is sandwiched between the first press roller 71, which is located at the most upstream position, and the form block 46. The roller 71 presses the glass sheet 40 against the form block 46 through the above-described heat-resistant belt 45.

The heat-resistant belt 45 travels downstream in the glass conveying direction while sliding along the forming face, and guides the glass sheet 40 downstream. Then, the front end of the glass sheet 40 reaches the second press roller 72, as is shown in FIG. 10. The travelling speed of the heat-resistant belt 5 is preferably set to a speed in the range of 80 mm/sec to 400 mm/sec. At this stage, the glass sheet 40 is still substantially flat, since no bending has been performed yet.

From the situation shown in FIG. 10, the glass sheet is conveyed further downstream. First, the glass sheet 40 is pressed against the form block 46 while the second press roller 71 slowly lifts the front end of the glass sheet 40 upwards. At this position, the forming face of the form block recedes slightly upwards, while the glass sheet is also bent slightly in the cross direction. As a result, the bending of the glass sheet 40 begins at this stage.

During the bending, the entire upper surface of the glass sheet 40, which is pressed upwards by the press rollers 47, contacts the heat-resistant belt 45, so that the glass sheet 40 is conveyed while keeping a stable orientation.

After the glass sheet has passed through the bending region and has been formed into a predetermined shape, it passes a slit in the partition board 84 and is conveyed into the quenching device. In the quenching device, the glass sheet 40 is tempered or semi-tempered by blowing cool air onto it while conveying it at a constant speed with the conveying rollers 83. The curved glass also can be annealed without quenching.

With this method, surface defects such as roller marks, that are difficult to avoid with conventional methods, do not occur, and a curved glass sheet can be continuously manufactured.

Moreover, when a belt in accordance with the first to third embodiments was used for the heat-resistant belt 45, surface defects in the glass sheet caused by steps in the junction portion of the belt could be eliminated. Moreover, when a belt in accordance with the fourth embodiment was used for the heat-resistant belt 45, and the glass sheet was bent while controlling the position and size of the belt in the cross direction, defects in the surface of the glass sheet caused by deformations of the belt surface could be eliminated.

Curved glass sheets with a curvature radius of 1300 mm in the conveying direction and a curvature radius of 50000 mm in the cross direction were obtained. Moreover, when forming a glass sheet with a form block having a forming face that was unsymmetrical in the cross direction of the glass sheet, it was equally possible to manufacture a curved glass sheet efficiently without surface defects.

Figure 13:
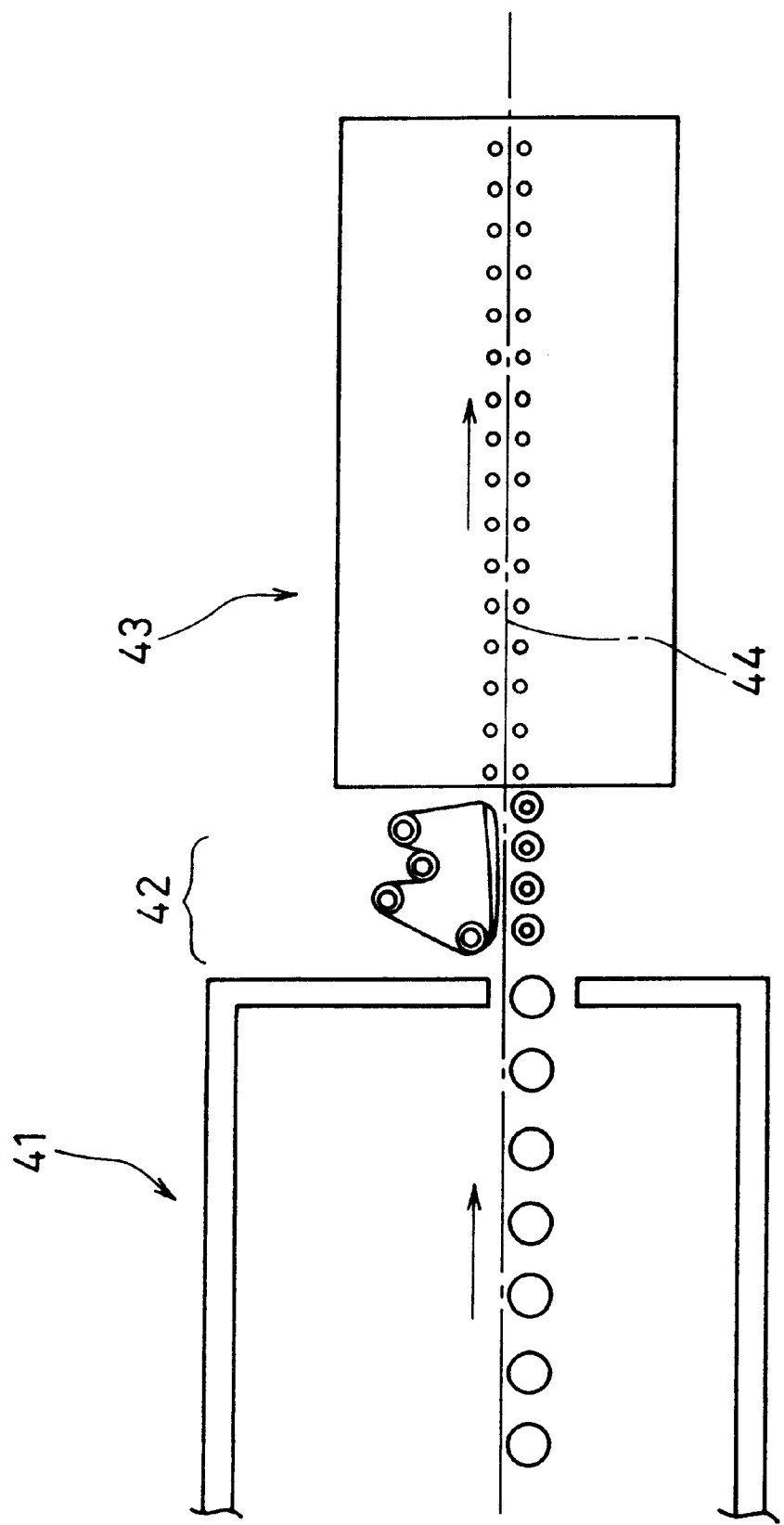
FIG. 13 is a cross-sectional view showing another embodiment of an apparatus for performing the manufacturing method of the present invention.

In this embodiment, the glass sheet is bent in two directions, that is, the glass conveying direction and the cross direction. However, in accordance with the present invention, it is also possible to bend the glass sheet only in one of those two directions. For example, if the glass sheet is bent only in the cross direction of the glass sheet, the furnace 41, the bending device 42, and the quenching device 43 can be arranged along a glass conveying passage 44 that extends in the horizontal direction, as is shown in FIG. 13. Using such an apparatus, the handling of the glass sheet after the bending becomes easier. FIG. 13 illustrates a cross-section along the center in the cross direction of the glass conveying passage 44.

Figure 14:
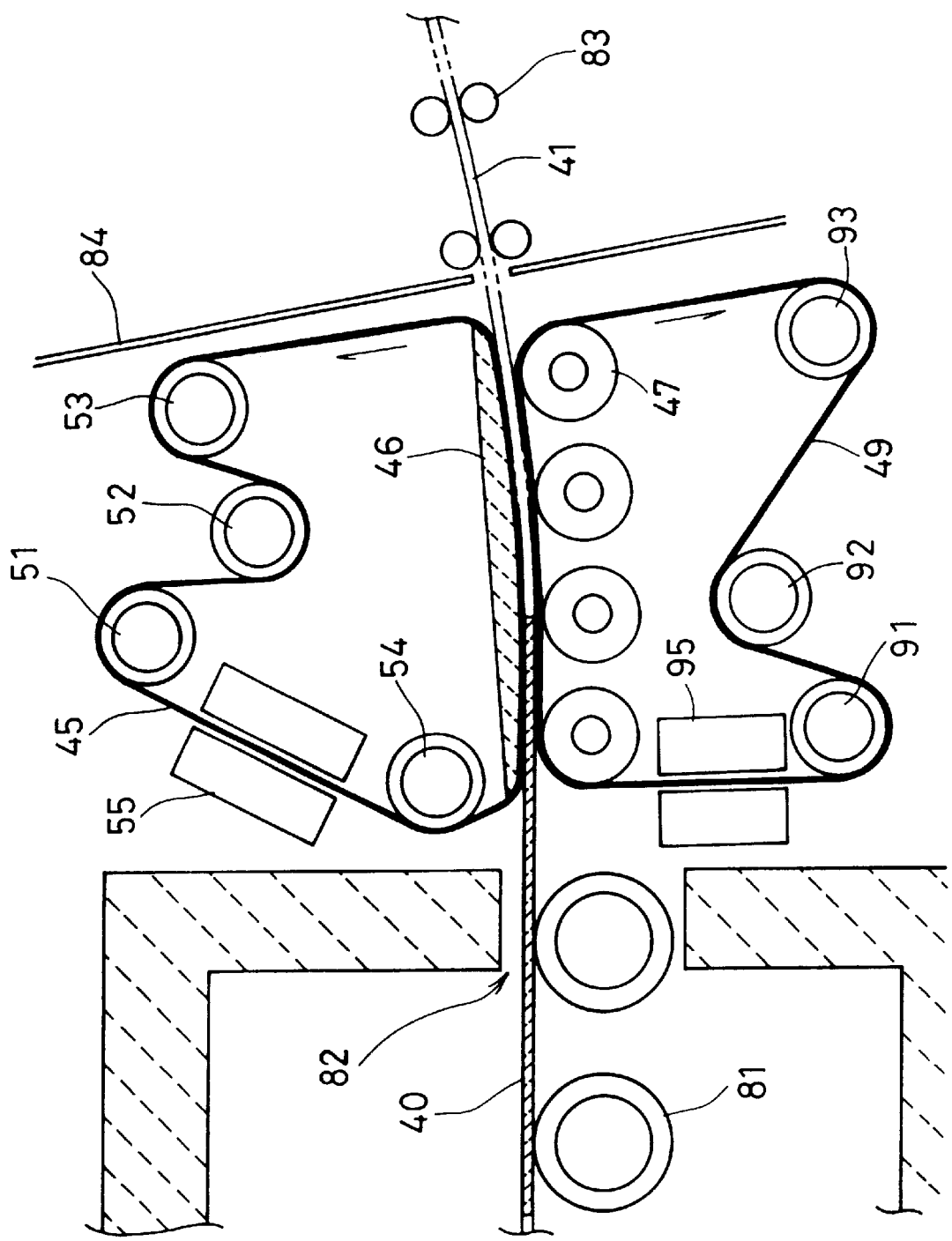
FIG. 14 is a cross-sectional view showing another embodiment of a bending device.

In this embodiment, only one belt was used, but the present invention is not limited to the use of one belt, and it is also possible to perform the bending using two belts 45 and 49 arranged above and below the glass conveying passage 44, as shown in FIG. 14. If the glass sheet is bent while being sandwiched between this pair of belts, the forming freedom and surface shapes for the curved glass sheet can be improved even further. In this case, it is preferable that also the second belt 49 comprises rollers 91 including a driving roller 91, and a tension roller 92, and is arranged in cooperation with a belt temperature adjustment device 95.

The belts of the present invention, and especially the belts having fitting portions are not limited to this embodiment, but as has been shown in the present embodiment, these belts are particularly appropriate for a method for applying a curvature at least in the cross direction of the glass sheet, because belt shifts and belt deformations appear particularly often when bending in the cross direction.

In the above methods, there is no need to stop each of the glass sheets for forming them; during the bending, at least one surface of the glass sheet is retained by the belt. Consequently, a bent glass sheet with little surface defects can be manufactured continuously and with high efficiency.

The method of this invention includes any situation in which pressure is exerted between the belt and the glass sheet, regardless of whether the pressure originates from the side of the belt or the side of the glass sheet or the both sides.

This invention also includes an apparatus for bending a heated glass sheet. The apparatus comprises a furnace for heating a glass sheet to a temperature where the glass sheet is changeable in shape, and a bending apparatus adjacent to the furnace so as to accept the glass sheet from the furnace and bend the glass sheet while conveying the glass sheet. The bending apparatus includes at least one belt of the present invention for pressing a surface of the glass sheet.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A belt for bending a heated glass sheet having a heat-resistant surface for pressing a surface of the glass sheet, comprising a strip of a heat-resistant member for forming the heat-resistant surface, the strip having opposing long edges and opposing short edges, the long edges extending transverse to the short edges, wherein the heat-resistant member is arranged so that the heat-resistant surface defines an endless track and the short edges of the strip are not exposed at the heat-resistant surface.

2. The belt according to claim 1, wherein (a) two end surfaces of the heat-resistant member, (b) two bent portions formed by folding the two end surfaces from an outer periphery of the endless track to an inner periphery of the endless track, or (c) one end surface of the heat-resistant member and one bent portion formed by folding the other end surface from an outer periphery of the endless track to an inner periphery of the endless track oppose each other on the endless track.

3. The belt according to claim 1, wherein two bent portions formed by folding the end surfaces of the heat-resistant member from an outer periphery of the endless track to an inner periphery of the endless track oppose each other on the endless track, and the end surfaces are arranged at the inner periphery so that the heat-resistant member has substantially the same thickness along substantially the entire circumference of the endless track.

4. The belt according to claim 1, wherein two bent portions formed by folding the end surfaces of said heat-resistant member from an outer periphery of said endless track to an inner periphery of the endless track oppose each other on said endless track, and the end surfaces oppose each other at the inner periphery.

5. The belt according to claim 1, further comprising a supporting member arranged at an inner periphery of the endless track, wherein the heat-resistant member is combined with the supporting member so that two end surfaces of the heat-resistant member oppose each other on the endless track.

6. The belt according to claim 5, wherein two end surfaces of the supporting member oppose each other at an inner periphery of said endless track.

7. The belt according to claim 1, wherein the heat-resistant member has fitting portions arranged along a pair of side-edges of the endless track.

8. A method for bending a heated glass sheet by pressing a heat-resistant surface of a belt against the glass sheet, the belt comprising a strip of a heat-resistant member for forming the heat-resistant surface, the strip having opposing long edges and opposing short edges, the long edges extending transverse to the short edges, wherein the heat-resistant member is arranged so that the heat-resistant surface defines an endless track and the short edges of the strip are not exposed at the heat-resistant surface, wherein the glass sheet is bent while rotating the belt along the endless track and conveying the glass sheet along a portion of the endless track.

9. The method according to claim 8, wherein the glass sheet is bent at least in a direction that is perpendicular to the endless track.

10. The method according to claim 8, wherein the heat-resistant member has fitting portions arranged along a pair of side-edges of the endless track, wherein the glass sheet is bent while rotating the belt along the endless track with a roller that comprises members that fit into the fitting portions of the belt, and conveying the glass sheet along a portion of the endless track.

11. The method according to claim 10, wherein the members of the roller engage the fitting portions of the belt.

12. An apparatus for bending a heated glass sheet comprising:

a furnace for heating a glass sheet to a temperature where the glass sheet is changeable in shape, and a bending apparatus adjacent to the furnace so as to accept the glass sheet from the furnace and bend the glass sheet while conveying the glass sheet, wherein the bending apparatus includes at least one belt that has a heat-resistant surface for pressing a surface of the glass sheet, and the belt comprises a strip of a heat-resistant member for forming the heat-resistant surface, the strip having opposing long edges and opposing short edges, the long edges extending transverse to the short edges, wherein the heat-resistant member is arranged so that the heat-resistant surface defines an endless track and the short edges of the strip are not exposed at the heat-resistant surface.

13. The apparatus of claim 12, wherein the heat-resistant member has fitting portions arranged along a pair of side-edges of the endless track.

* * * * *